(12) United States Patent
Lii et al.

(10) Patent No.: US 6,226,875 B1
(45) Date of Patent: May 8, 2001

(54) GRASS SHEARS

(76) Inventors: Sheau Pyng Lii; Kuo Chen Liu, both of P. O. Box 63-99, Taichung (TW), 406

(*) Notice: Subject to any disclaimer, the term of this patent is extended or adjusted under 35 U.S.C. 154(b) by 0 days.

(21) Appl. No.: 09/507,055

(22) Filed: Feb. 19, 2000

(51) Int. Cl.7 .................................................. B26B 15/00
(52) U.S. Cl. ................................................ 30/228; 30/500
(58) Field of Search ........................... 30/228, 500, 249, 30/250, 122

(56) References Cited

U.S. PATENT DOCUMENTS 3,408,875 * 11/1968 Briskman et al. ................ 30/228 X
3,536,976 * 10/1970 Briskman et al. ................ 30/228 X

* cited by examiner

*Primary Examiner*—Douglas D. Watts

(57) ABSTRACT

A pair of grass shears includes a base blade having a handle secured to one end, and a movable blade rotatably secured to the base blade. A follower is rotatably received in the handle and has an eccentric shaft slidably engaged in a slot of the movable blade. The movable blade may be rotated relative to the base blade when the follower is rotated to move the eccentric shaft along the slot of the movable blade. Two gears are rotatably received in the handle and engaged with each other. One of the gears is secured to the follower. The other gear may be coupled to and driven by the power tool.

3 Claims, 5 Drawing Sheets

GRASS SHEARS

BACKGROUND OF THE INVENTION

1. Field of the Invention

The present invention relates to a shear device, and more particularly to a pair of grass shears.

2. Description of the Prior Art

Typical grass shears comprise two cutting blades movable relative to each other for cutting grass or the like. However, the typical grass shears are operated manually and may not be operated by power tools.

The present invention has arisen to mitigate and/or obviate the afore-described disadvantages of the conventional grass shears.

SUMMARY OF THE INVENTION

The primary objective of the present invention is to provide a pair of grass shears operatable with power tools.

In accordance with one aspect of the invention, there is provided a pair of grass shears comprising a first blade including a first end having a handle provided thereon, a second blade rotatably secured to the first blade at a pivot pin and including a slot formed therein, a follower rotatably received in the handle and including an eccentric shaft extended therefrom and slidably engaged in the slot of the second blade, and means for rotating the follower to move the eccentric shaft along the slot of the second blade and to rotate the second blade relative to the first blade about the pivot pin.

The rotating means includes a first gear rotatably received in the handle and secured to the follower, and includes a second gear rotatably received in the handle and engaged with the first gear.

The handle includes a cap secured thereto for rotatably supporting the first gear and the second gear in the handle. The cap includes an orifice and an aperture and a cavity formed therein, the first gear is rotatably secured in the handle at a pivot rod, the pivot rod includes a first end rotatably engaged in the orifice of the cap. The second gear is partially and rotatably secured in the cavity of the handle at a pivot pole, the pivot pole includes a first end rotatably engaged in the aperture of the cap.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
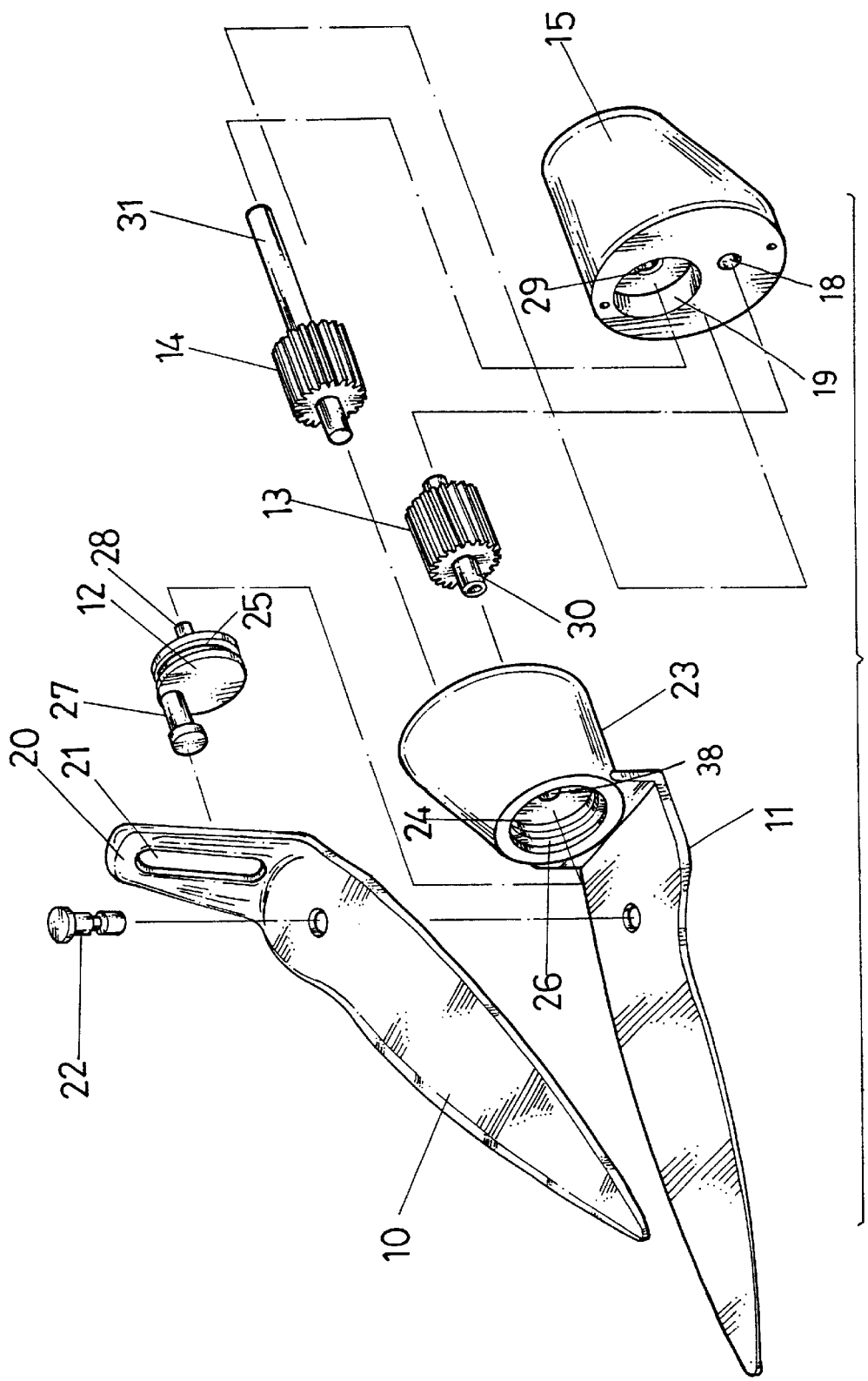
FIG. 1 is an exploded view of a pair of grass shears in accordance with the present invention.
Figure 2:
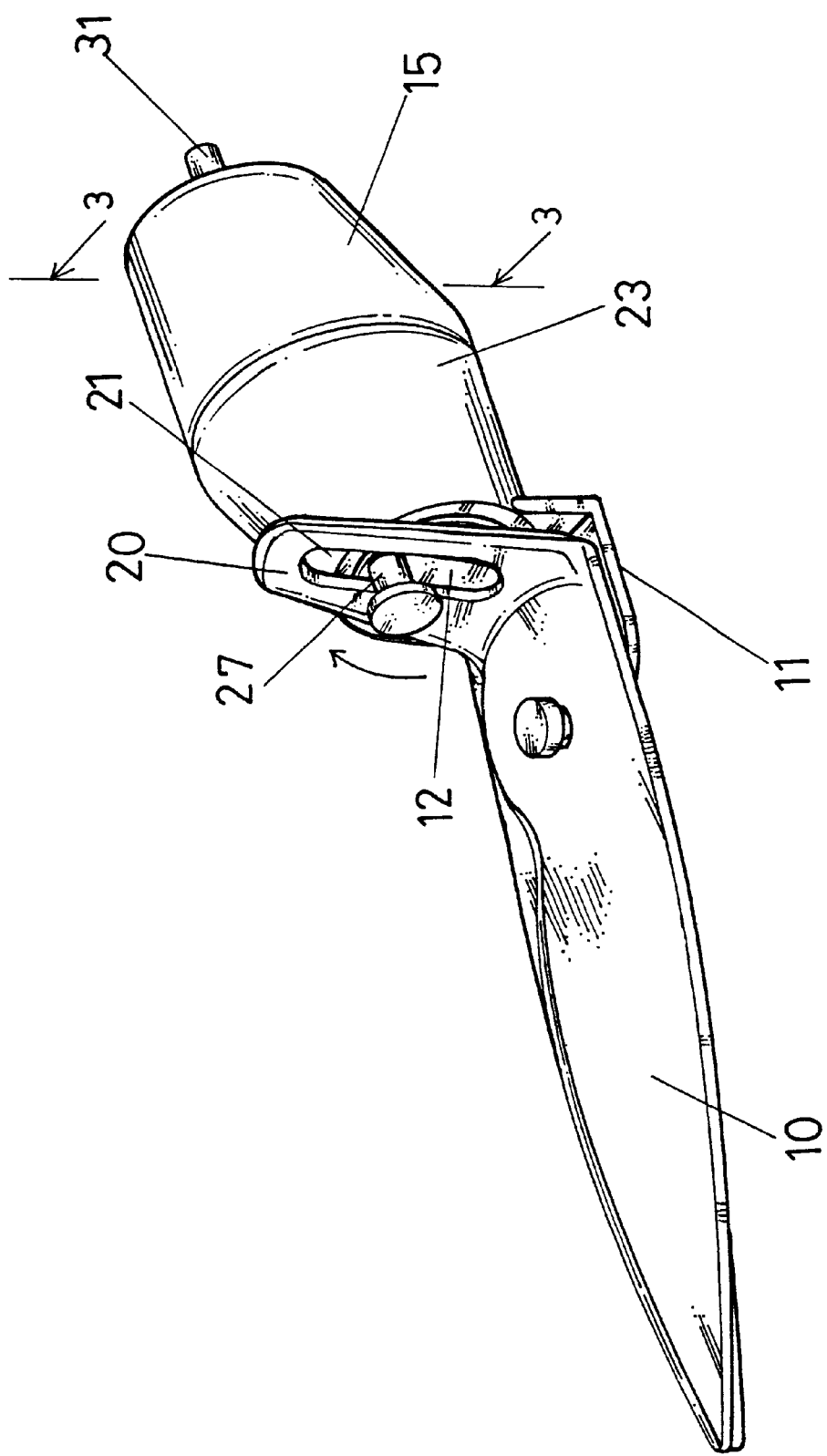
FIG. 2 is a perspective view of the grass shears.
Figure 3:
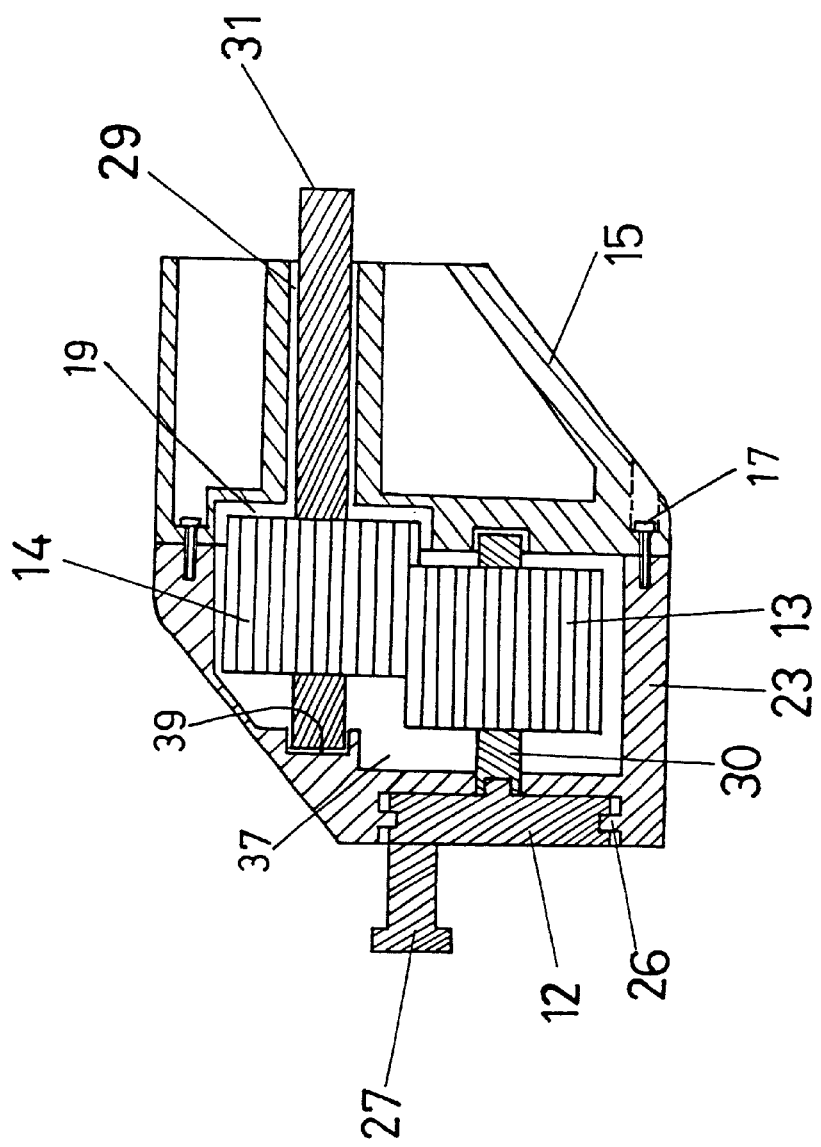
FIG. 3 is a cross sectional view taken along lines 3—3 of FIG. 2.

Referring to the drawings, and initially to FIGS. 1–3, a pair of grass shears in accordance with the present invention comprises a movable blade 10 pivotally or rotatably secured on a fixed or base blade 11 at a pivot pin 22 for allowing the movable blade 10 to be rotated relative to the base blade 11 about the pivot pin 22. The base blade 11 includes one end having a handle 23 provided thereon and having a recess 24 formed in the handle 23 for rotatably receiving a follower 12 therein. The handle 23 includes a projection, particularly a peripheral or an annular projection 26 extended inward of the recess 24 of the handle 23 for rotatably engaging with the peripheral or the annular groove 25 that is formed in the outer peripheral portion of the follower 12, such that the follower 12 may be rotatably secured to the handle 23. The annular projection 26 preferably includes a rounded side portion for allowing the follower 12 to be forced into the recess 24 of the handle 23 and to be forced to engage with the annular projection 26. The movable blade 10 includes a rear end having a flap 20 extended upward therefrom and having a slot 21 formed in the flap 20 and arranged in a direction perpendicular to the blade 10.

Figure 4:
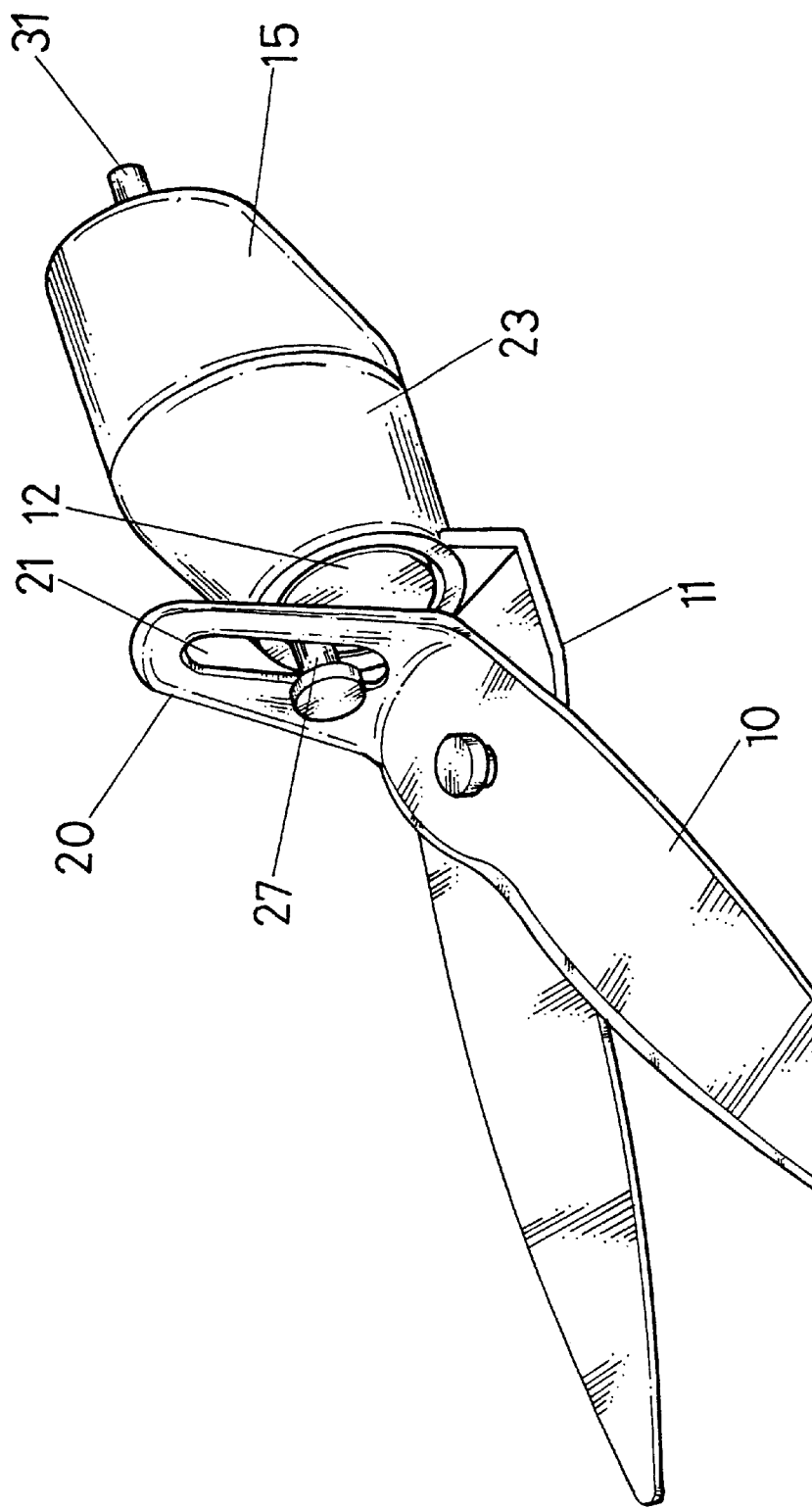
FIG. 4 is a perspective view illustrating the operation of the grass shears.

As shown in FIG. 3, the handle 23 includes a chamber 37 formed therein and preferably formed in the rear portion thereof and opposite to the fixed blade 11. The handle 23 includes an orifice 38 formed therein and communicating with the recess 24 and the chamber 37 of the handle 23. The follower 12 includes a spindle 28 extended rearward therefrom and preferably extended rearward at the center thereof and includes a shaft 27 eccentrically extended forward therefrom and slidably engaged in the slot 21 of the flap 20 for rotating the movable blade 10 relative to the base blade 11 about the pivot pin 22 to cut the grass when the follower 12 is rotated about the spindle 28 thereof (FIGS. 2, 4). A gear 13 is rotatably secured in the handle 23 at a pivot rod 30 which has one end secured to the spindle 28 of the follower 12 by such as a key engagement or by fasteners etc. A cap 15 is secured to the rear portion of the handle 23 with fasteners 17 and includes an orifice 18 and a cavity 19 formed therein and includes an aperture 29 formed therein and communicating with the cavity 19 of the cap 15. The other end of the pivot rod 30 is preferably rotatably engaged in the orifice 18 of the cap 15.

As best shown in FIGS. 1 and 3, another gear 14 is rotatably received in the chamber 37 of the handle 23 at a pivot pole 31 and is engaged with the gear 13 for rotating the follower 12 via the gear 13. The pivot pole 31 has one end rotatably received in a depression 39 of the handle 23 and has the other end portion rotatably engaged in or supported within the aperture 29 of the cap 15. The gear 14 preferably has a portion rotatably received in the cavity 19 of the cap 15. The pivot pole 31 has the rear end extended outward of the handle 23 or of the cap 15 for coupling to a power tool, such as a power tool for drilling purposes, which may rotate the follower 12 and thus the movable blade 10 via the gears 13, 14. The movable blade 10 may thus be rotated relative to the base blade 11 about the pivot pin 22 in a reciprocating action by the power tools via the gears 13, 14 and the follower 12.

The pivot rod 30 and the pivot pole 31 may be formed as an integral piece with the respective gears 13, 14 and extended from the respective gears 13, 14, and may be engaged into and secured to the respective gears 13, 14 with fasteners, or with a key engagement, or with a welding process. The gears 13, 14 may be made to the same size, or may be made to different sizes having different teeth provided thereon for allowing the movable blade 10 to be rotated relative to the base blade 11 with different cutting speeds.

Figure 5:
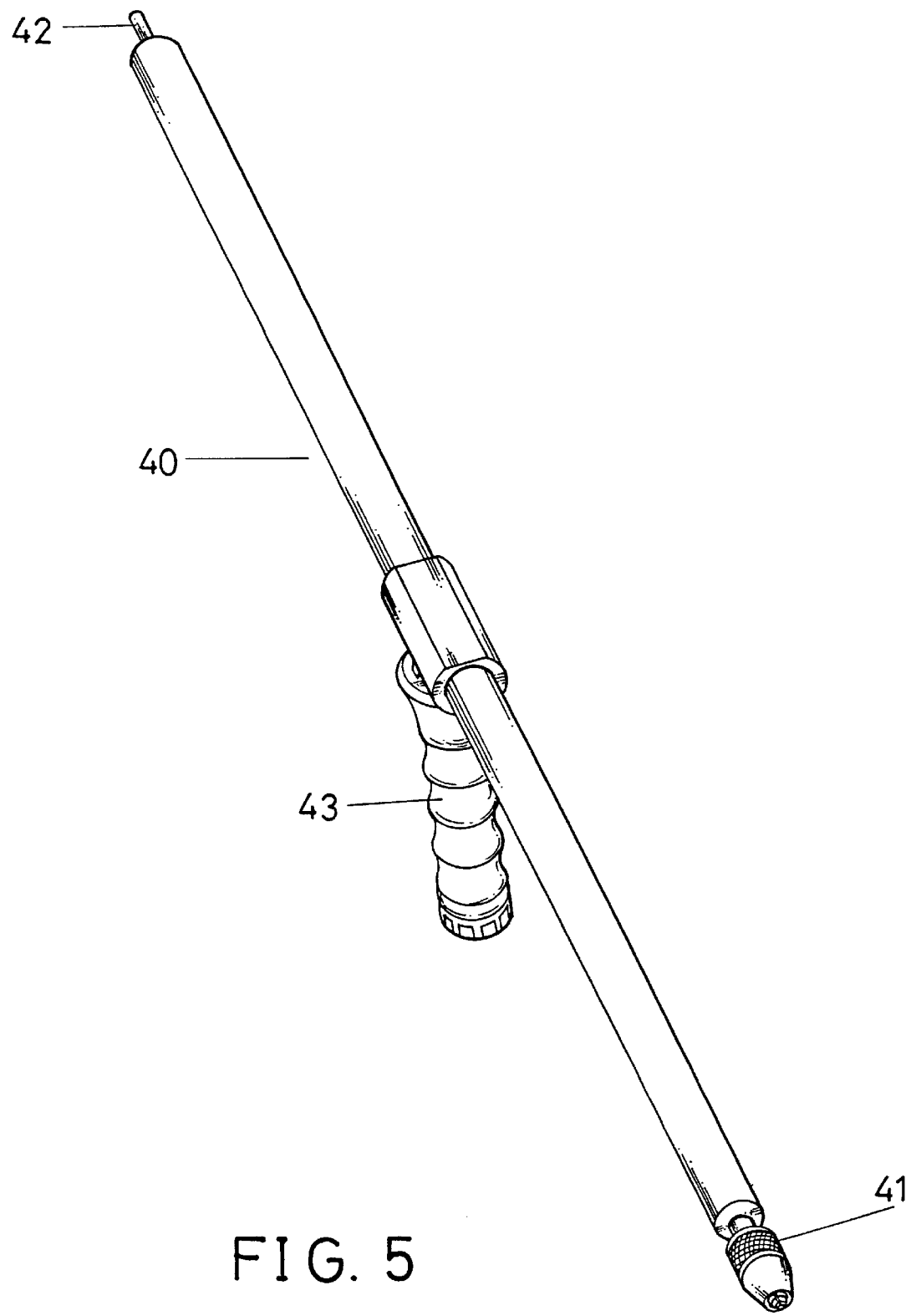
FIG. 5 is a perspective view of a tool extension for coupling to the grass shears and for allowing the grass shears to be operated in a higher place.

Referring next to FIG. 5, an extension 40 has a hand grip 43 secured thereto and has an axle 42 rotatably received therein and has a chuck 41 secured to one end of the axle 42 for securing to the rear end of the pivot pole 31. The other end of the axle 42 may be secured to the power tool for allowing the grass shears to be operated to cut the tree leaves and the tree branches at a higher position.

It is to be noted that the typical grass shears may be operated manually only and may not be operated by power tools. In addition, the typical grass shears may not be operated to cut the tree leaves or the tree branches at the higher position. The flap 20 may also be parallel to the blade 10 instead of being perpendicular to the blade 10, and the follower 12 may be arranged in a position 90 degrees relative to that shown in FIG. 3 for slidably engaging into the s Accordingly, the pair of grass shears in accordance with the present invention may be coupled to and operated with power tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed:

1. A pair of grass shears comprising:

a first blade including a first end having a handle provided thereon, a second blade rotatably secured to said first blade at a pivot pin and including a slot formed therein, a follower rotatable received in said handle and including an eccentric shaft extended therefrom and slidably engaged in said slot of said second blade, and means for rotating said follower to move said eccentric shaft along said slot of said second blade and to rotate said second blade relative to said first blade about said pivot pin, said rotating means including a first gear rotatably received in said handle and secured to said follower and including a second gear rotatably received in said handle and engaged with said first gear, said handle including a cap secured thereto for rotatably supporting said first gear and said second gear in said handle, said cap including a cavity formed therein, said second gear being partially and rotatably received in said cavity of said cap.

2. The grass shears according to claim 1, wherein said cap includes an orifice formed therein, said first gear is rotatably secured in said handle at a pivot rod, said pivot rod includes a first end rotatably engaged in said orifice of said cap.

3. The grass shears according to claim 1, wherein said cap includes an aperture formed therein, said second gear is rotatably secured in said handle at a pivot pole, said pivot pole includes a first end rotatably engaged in said aperture of said cap.

\* \* \* \* \*